| United States Patent [19] | [11] Patent Number: 4,923,332 |
|---|---|
| Sanocki et al. | [45] Date of Patent: May 8, 1990 |

[54] HIGH TEMPERATURE RESISTANT OIL BOOM FLOTATION CORE

[75] Inventors: Stephen M. Sanocki, Mounds View; Donald D. Johnson, Chisago; Edward M. Fischer, White Bear Lake, all of Minn.

[73] Assignee: Minnesota Mining and Manufacturing Company, St. Paul, Minn.

[21] Appl. No.: 309,416

[22] Filed: Feb. 10, 1989

[51] Int. Cl.[5] .............................................. E02B 15/04
[52] U.S. Cl. .......................................... 405/63; 405/72
[58] Field of Search .................................. 405/63-72; 114/267; 210/242.3, 923

[56] References Cited

U.S. PATENT DOCUMENTS

| 4,537,528 | 8/1985 | Simpson | 405/72 |
| 4,605,586 | 8/1986 | Lane | 405/63 X |
| 4,619,553 | 10/1986 | Fischer | 405/63 |
| 4,645,376 | 2/1987 | Simpson | 405/63 |
| 4,781,493 | 11/1988 | Fischer | 405/63 |

*Primary Examiner*—David H. Corbin
*Attorney, Agent, or Firm*—Donald M. Sell; Walter N. Kirn; David W. Anderson

[57] ABSTRACT

A high temperature resistant flotation core and a high temperature resistant oil containment boom which allows for the in-situ burning of spilled or leaked oil during offshore oil spill cleanup operations are disclosed. The boom can also be used for precautionary fire containment during non-burn oil spill cleanups and can be easily recovered and redeployed.

10 Claims, 1 Drawing Sheet

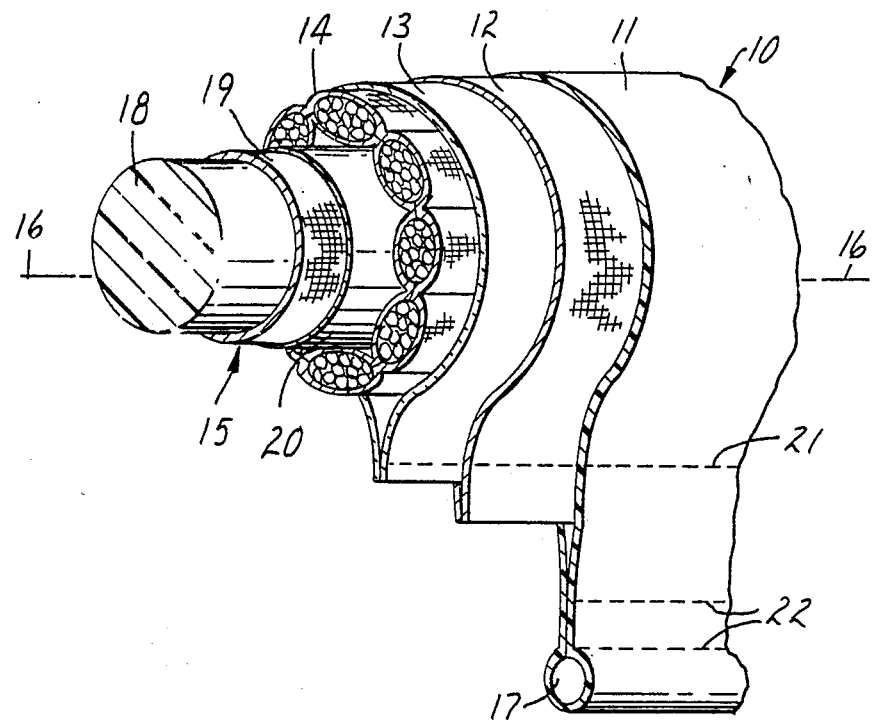

HIGH TEMPERATURE RESISTANT OIL BOOM FLOTATION CORE

FIELD OF THE INVENTION

The present invention relates generally to floating oil containment booms, and particularly those which allow the in-situ burning of contained oil.

BACKGROUND OF THE INVENTION

The present invention relates to a high temperature resistant flotation core and to a high temperature resistant oil containment boom constructed therefrom which allows for the in-situ burning of spilled or leaked oil during offshore oil spill cleanup operations. In-situ burning represents one of the most effective means of eliminating large quantities of spilled oil. If conducted properly, with due consideration for the temporary reduction of air quality and the potential for exposure to fire, the in-situ burning of an oil spill can result in the least overall impact to the environment.

The remoteness of many oil exploration, production, and transportation activities (e.g., Alaska), combined with the nature of the environment, provides ideal conditions for in-situ combustion. When considered in conjunction with mechanical cleanup, chemical dispersants, and natural elimination processes, burning often provides an important option when some of the other techniques alone are impractical. For this reason, the oil industry in Alaska and in Canada has conducted numerous research efforts to identify the most efficient means of burning oil in place (Shell Oil Company et. al., 1983; S. L. Ross Environmental Research Limited, 1983).

Such research has revealed that oil can be ignited and combustion sustained when the oil layer on water is at least 1 to 2 mm thick. As thicknesses increase beyond this minimum value, there is less tendency for heat loss to the underlying water, and therefore the chances are greater for efficient combustion. Thick oil layers have been consistently burned with efficiencies in excess of 95%, even under artic conditions. To achieve such success through burning, it is important to concentrate any spilled oil as quickly as possible and to contain the burning oil so that winds and/or currents can help thicken the oil slick. During the burning process, temperature in the order of 1200° C. is common.

Conventional oil containment booms are elongated cylinders having a generally circular cross-section. These booms float in water with approximately one-third of the boom submerged below the surface of the water forming a floating barrier to the spilled oil. The booms are typically stored in a roll on the deck of a ship and deployed downwind of a spill where it floats on the surface of the water and temporarily contains the spill.

U.S. Pat. No. 4,537,528 is directed to a fireproof boom core containing a flammable pollutant on a water surface, the boom comprising a flotation member of foamed polypropylene and at least two layers of heat-resistant, water-sorbent material surrounding the flotation member and extending into the water in the form of a depending skirt. The skirt functions to draw water up into the layers of heat-resistant material forming steam in the presence of flaming pollutant thereby allowing only the outer layer of heat-resistant material to become slightly singed. It is understood that a bottom-tensioned, cylindrical-flotation fire containment boom is manufactured by Fire Control Inc. utilizing the teachings of said patent. The boom consists of multiple layers of fire-resistant, wicking fabric positioned over steel canisters for flotation. An additional sacrificial layer and a coarse, wire-mesh barrier are used externally for abrasion resistance.

U.S. Pat. No. 4,619,553 discloses an oil boom system which utilizes a multilayered, fire-resistant blanket, and is manufactured by Minnesota Mining and Manufacturing Company (3M), the assignee of the present invention. The fire-resistant blanket is used as an add-on high temperature protective blanket to convert most conventional types of booms to a containment for burning oil. The blanket is placed about the periphery of the boom and is held in position by any number of fastening systems.

Another oil boom system provided by 3M is a high temperature oil containment boom which allows for the in-situ burning of spilled or leaked oil. The boom comprises an outer layer of polymer coated fabric, a first underlayer of high temperature resistant refractory fabric and a second underlayer of a high or intermediate temperature resistant refractory fabric which constrains and assists in retaining the integrity of a low density, high temperature resistant core. The layers are unified by sewing with high temperature resistant, ceramic thread or by mechanical fasteners.

Still another oil boom system provided by 3M is a redeployable high temperature resistant oil containment boom containing a cellular core. The oil containment boom comprises an outer layer of polymer coated fabric, a first underlayer of stainless steel mesh and a second underlayer of a high or intermediate temperature resistant refractory tight weave hybrid ceramic textile fabric, all of which surround and encase a cellular, high temperature resistant flotation core of inorganic spheres or granules contained and rolled in a stainless steel mesh. The layers are unified by sewing with high temperature resistant ceramic thread or mechanical fasteners.

Problems associated with the above mentioned fire containment oil booms are that they are either difficult to recover or are not reusable and some are not redeployable in the event it was found unnecessary to burn the oil. Furthermore, those which depend upon wicking to function often can plug because of contamination by silt or salt water. Even those which do not depend upon wicking to function, such as the latter mentioned boom which contained a cellular core, tended to lose as much as fifty percent of its buoyancy during use. These problems lead to less than desirable performance.

SUMMARY OF THE INVENTION

The present invention relates to a high temperature resistant flotation core and to a high temperature resistant oil containment boom constructed therefrom which allows for the in-situ burning of spilled or leaked oil and, in the event that the contained oil is not burned, the boom can be recovered, cleaned in the same manner as a conventional oil containment boom and stored for future deployment. The boom is capable of withstanding sustained exposure to temperatures of 1200° C., thus allowing in-situ burning of the contained oil during offshore oil spill cleanup operations. The oil boom can also be employed as a precautionary measure during traditional oil spill cleanup operations to provide protection should accidental ignition of the spilled oil occur. In this situation, the boom would, of course, be recovered and processed for redeployment.

The oil boom of the present invention comprises an outer layer, a first underlayer of knitted wire mesh, a second underlayer of high temperature resistant refractory fabric and a heat insulating spacer surrounding a novel high temperature resistant flotation core. The layers are unified by sewing with high temperature resistant ceramic thread, metal thread or mechanical fasteners.

The novel high temperature resistant flotation core comprises a closed cell foam log covered by a high temperature resistant knitted wire mesh and optionally covered by a metal foil. The flotation core with the optional metal foil covering is preferred.

BRIEF DESCRIPTION OF THE DRAWING

The drawing is a perspective view, partially in section, of the high temperature resistant flotation core and oil containment boom of the present invention.

DESCRIPTION OF THE PREFERRED EMBODIMENT

The invention can best be understood by reference to the drawing. The high temperature resistant oil containment boom 10 is comprised of outer layer 11 of polymer coated fabric, a first underlayer 12 of knitted wire mesh, a second underlayer 13 of high temperature resistant, refractory tight weave hybrid ceramic textile fabric and a heat insulating spacer 14, all of which surround and encase a high temperature resistant flotation core 15. Water line 16 shows that the oil containment boom 10 floats on the water with approximately 30% of the boom below the surface.

Polymer coated fabric outer layer 11 is preferably nylon fabric coated with low alkali content polyvinylchloride (PVC). Other fabrics and polymer coatings may be used. Examples include polyester fabric and polyurethane coatings. Outer layer 11 of this invention allows the high temperature oil boom to be conveniently handled and function, if desired, as a conventional non-fire oil containment boom. Outer layer 11, during fire containment, melts to the water line 16 causing the underlayer 12 and 13 to be exposed to the burning oil. Outer layer 11, may also, if desired, be provided with a ballast chain pocket 17.

The first underlayer 12 is a knitted wire mesh made of stainless steel, inconel, steel, galvanized steel or other suitable alloys. A preferred knitted wire mesh is 310 stainless steel (available from Metex Corporation) having a wire diameter of about 250 micrometers with knitted opening sizes corresponding to a density of 60. The density number relates to the spacing of the needles on the knitting machine and is well known in the industry.

A high temperature resistant refractory fabric 13 is preferably a 0.64 mm thick open mesh, tight weave, 3×3 picks/cm ceramic/metal hybrid (85% ceramic/15% refractory metal wire) fabric woven from 2000 denier, ½ served continuous polycrystalline ceramic fiber yarn comprising, by weight, 70% aluminum oxide, 2% boron oxide and 28% silicon dioxide (commercially available as Nextel 440 fibers and fabrics from 3M) and 304 stainless steel wire. The specific fabric 13 has a basis weight of 0.37 kg/m². Other fabrics which can be used as high temperature resistant fabric 13, provided they are similarly woven, include fabrics fabricated from Nextel 312 ceramic yarn comprising, by weight, 62% aluminum oxide, 24% silicon dioxide and 14% boron oxide (3M), Astroquartz ceramic fibers (J. P. Stevens) and leached fiberglass filaments (Hitco or Haveg) or hybrid combinations thereof.

The high temperature resistant refractory fabric 13 may optionally be coated with a polymer coating such as a silicone rubber, a neoprene rubber or a fluorinated elastomer. The polymer coating serves to hold the yarns firmly in place during assembly and provides an abrasion resistant coating for the fabric 13 and provides protection to the fabric during shipping, storage and deployment. A particularly preferred coating for the present invention is Neoprene GN (duPont), which is applied to the fabric 13 at a coating weight of 0.16 kg/m². The coating solution is applied by dip coating the yarn while leaving the mesh interstices substantially open. The fabric 13 is thereafter allowed to dry and cure at a temperature of 160° C. before the fabric is incorporated into the boom. It will be appreciated that the polymer coating, when within areas exposed to the heat of combustion of the spilled oil, will be burned off but it will have served its processing and protection functions. Fabric 13 retains its high temperature characteristics even without polymer coating.

Heat insulative spacer 14, may be 3M Macrolite ceramic spheres or Pyrofoam ceramic spheres contained in a spacer roll of knitted 304 stainless steel wire mesh. The spacer is constructed by utilizing a 196 cm long and 107 cm wide piece of mesh tubing and fastening seams alternately spaced 7.6 cm and 10.2 cm apart using stainless steel sewing thread or wire (2 stitches/cm) or stainless steel staples (1 staple/2.5 cm). A total of 22 such seams are produced thus generating 11 cells 14. Cutting along the upper edge opens the cells and the 10.2 cm cells are filled with ceramic spheres. The spheres are impermeable to water and other fluids and, being a true ceramic, are functional at extremely high temperatures. The sphere's outer surface can be altered to provide other physical and chemical properties. Pyrofoam ceramic spheres or granules are preferred and are available from High Temperature Insulation Materials, Route 14, Box 2337A, Kennewick, Wash. 99337. Other wire meshes such as inconel or galvanized steel or high temperature refractory fabrics are also satisfactory for spacer 14. The empty and filled cells are then rolled into a heat insulating spacer around the flotation core 15 and secured.

High temperature resistant flotation core 15 is a 20 cm diameter by 60 cm long closed cell foam log 18 wrapped in a knitted wire mesh 19 and preferably covered by an oil resistant, heat reflecting and heat conducting metal foil 20. It is contemplated that the foil 20, however, may be positioned adjacent the core 15 and both covered by the wire mesh 19. Foam log 18 may be a glass foam (such as Foamglas cellular foam available from Pittsburg Corning) or borosilicate ceramic foam (available from Thorpe Products) or composites thereof. Glass foam is preferred because of cost and availability. A closed, hollow metal container could also be used, but because of weight, cost and possible explosive hazard is not desirable. Knitted wire mesh 19 may be stainless steel, inconel, steel, galvanized steel or alloys thereof. A preferred knitted wire mesh is 304 stainless steel (available from Metex Corporation) having a wire diameter of about 230 micrometers with knitted opening sizes corresponding to a density of 60. Metal foil 20 is 50 micrometer thick stainless steel foil. Other heat reflective and heat conductive metal foils would be suitable. Since the metal foil does not provide a sealed envelope, air pressure build-ups are avoided.

Useful flotation cores have been produced without metal foil 20, however it does serve to stop the flow of oil from passing through the boom.

Boom 10 is fabricated by layerwise assembling a composite of outer layer 11, first underlayer 12, second underlayer 13 and heat insulative spacer 14 in registration over flotation core 15. The thus formed composite structure is unified by sewing along line 21 using a high temperature resistant, ceramic thread, stainless steel thread or suitably spaced mechanical fasteners. If desired, the outer layer 11 could also be sewn together along lines 22 providing a ballast chain pocket 17. In view of the fact that seam lines 22 are below water during boom use, they are preferably produced by using heavy duty nylon.

To evaluate the utility of oil boom 10 under simulated use conditions, six 30 cm diameter booms with a 30 cm skirt were coupled together into a circular shape. The circular test boom was then placed into a 3 m diameter (1 m deep) steel tank which was filled with a mixture of 90 kilograms of salt added to 2300 liters of water to simulate ocean salt water. A crude oil fire was simulated by pumping approximately 3840 liters of heptane through a 2.5 cm diameter pipe at a rate of about 11.5 liters per minute over a six hour period to the center of the boomed area in the test tank. A 5 mph wind was blowing during the test. Thermocouples were attached to the crown of the booms and to a steel stand in the center of the containment area. The boom performed excellently to contain the burning fluid which reached temperatures as high as 1280° C. The most impressive performance characteristic was that the boom maintained a freeboard (percentage of surface area above the water line) of 70% before, during and after the fire test.

A comparative high temperature oil containment boom was constructed according to the teaching of patent application U.S. Ser. No. 103,268, and also assigned to the assignee of the present application, wherein a cellular flotation core is utilized was similarly tested as above. The comparative boom had a freeboard of 66% before the fire test which decreased during the test and after the fire test had a freeboard of only 33%.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

We claim:

1. A flotation core particularly useful as a high temperature resistant buoyancy member of an oil containment boom, comprising:
    a closed cell foam log to provide buoyancy; knitted wire mesh; and
    a layer of the metal foil covering said wire mesh.

2. A flotation core according to claim 1 wherein the covering of knitted wire mesh is constructed of material selected from stainless steel, inconel, steel, galvanized steel, or alloys thereof.

3. A flotation core according to claim 1 wherein said metal foil is stainless steel.

4. A flotation core according to claim 1 wherein said closed cell foam log is selected from glass foam, ceramic foam or combinations or composites thereof.

5. A high temperature resistant oil containment boom comprising an outer layer, a first underlayer of knitted wire mesh, a second underlayer of high temperature resistant refractory fabric covering of heat insulating covering of metal foil surrounding a flotation core including a closed cell foam log covered by a high temperature resistant knitted wire mesh, said outer, first and second layers being secured together at least about their peripheral edges.

6. A high temperature resistant oil containment boom according to claim 5 wherein said outer layer is a polymer coated fabric.

7. A high temperature resistant oil containment boom according to claim 6 wherein the polymer coated fabric is a nylon fabric coated with low alkali content polyvinylchloride.

8. A high temperature resistant oil containment boom according to claim 5 wherein said first underlayer of knitted wire mesh is constructed of material selected from stainless steel, inconel, steel, galvanized steel, or alloys thereof.

9. A high temperature resistant oil containment boom according to claim 5 wherein said second underlayer of high temperature resistant refractory fabric comprises a fabric woven from a ceramic fiber yarn or a combination of ceramic fiber yarn and refractory metal wire.

10. A high temperature resistant oil containment boom according to claim 9 wherein said ceramic fiber yarn comprises 70 weight percent aluminum oxide, 2 weight percent boron oxide and 28 weight percent silicon dioxide.

* * * * *